(12) United States Patent
Chen et al.

(10) Patent No.: US 10,393,496 B2
(45) Date of Patent: Aug. 27, 2019

(54) CLAMP-TYPE MEASURING DEVICE AND MEASURING METHOD

(71) Applicant: INDUSTRIAL TECHNOLOGY RESEARCH INSTITUTE, Hsinchu (TW)

(72) Inventors: Chin-Ming Chen, Taichung (TW); Shang-Te Chen, Taichung (TW); Po-Hsiu Ko, Taichung (TW); Ren-Hao Lu, Taichung (TW); Szu-Chia Lin, Yilan (TW); Meng-Chiou Liao, Yunlin County (TW); Kuan-Wen Chen, Taichung (TW); Hsi-Hung Hsiao, Taichung (TW); Shou-Xuan Chang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 111 days.

(21) Appl. No.: 15/851,457

(22) Filed: Dec. 21, 2017

(65) Prior Publication Data
US 2019/0154425 A1    May 23, 2019

(30) Foreign Application Priority Data
Nov. 17, 2017   (TW) .............................. 106139955 A

(51) Int. Cl.
*G01B 7/02* (2006.01)
*B23Q 17/00* (2006.01)
*B25B 5/16* (2006.01)

(52) U.S. Cl.
CPC ............. *G01B 7/02* (2013.01); *B23Q 17/003* (2013.01); *B25B 5/16* (2013.01); *B23Q 2703/02* (2013.01)

(58) Field of Classification Search
CPC .......... G01B 7/02; B25B 5/16; B23Q 17/003; B23Q 2703/02
(Continued)

(56) References Cited

U.S. PATENT DOCUMENTS

| 2,603,043 A | 7/1952 | Bontemps |
| 3,902,114 A | 8/1975 | Alich |

(Continued)

FOREIGN PATENT DOCUMENTS

| CN | 1695368 A | 11/2005 |
| CN | 101061368 A | 10/2007 |

(Continued)

OTHER PUBLICATIONS

Philip T. Smith Jr., "Analysis and Application of Capacitive Displacement Sensors to Curved Surfaces", University of Kentucky Master's Theses, Oct. 5, 2003.
(Continued)

*Primary Examiner* — Giovanni Astacio-Oquendo
(74) *Attorney, Agent, or Firm* — Maschoff Brennan

(57) ABSTRACT

The disclosure is related to a clamp-type measuring device includes a clamp and an interval measuring module. The clamp includes a guiding rail and two holding arm. Each of holding arms includes a guide part, a connecting part, and a clamping part. The guide part is movably furnished on the guiding rail. Both ends of the connecting part are respectively connected to the guide part and the clamping part. The interval measuring module includes a first measuring element and a second measuring element. The first measuring element and the second measuring element are furnished on the two connecting parts respectively. The first measuring element and the second measuring element are slidable through the two guide parts respectively in order to measure an interval between the two clamping parts. In addition, the
(Continued)

disclosure is also related to a measuring method of the clamp-type measuring device.

22 Claims, 7 Drawing Sheets

(58) Field of Classification Search
USPC .................. 324/207.2, 207.13, 207.11, 200
See application file for complete search history.

(56) References Cited

U.S. PATENT DOCUMENTS

| | | |
|---|---|---|
| 5,129,152 A | 7/1992 | Barr |
| 5,139,246 A * | 8/1992 | Yakou ................... B25B 1/18 269/242 |
| 5,339,699 A * | 8/1994 | Carignan ............... G01D 5/145 73/862.633 |
| 5,955,881 A | 9/1999 | White et al. |
| 6,005,395 A | 12/1999 | Chan et al. |
| 6,108,925 A | 8/2000 | Freitag |
| 6,297,750 B1 | 10/2001 | Wingate et al. |
| 6,626,476 B1 * | 9/2003 | Govzman ............ B25J 15/0273 294/119.1 |
| 6,670,806 B2 | 12/2003 | Wendt et al. |
| 7,259,553 B2 | 8/2007 | Arns, Jr. et al. |
| 7,557,965 B2 | 7/2009 | Taylo et al. |
| 9,821,468 B2 | 11/2017 | Jenkinson et al. |
| 2006/0151287 A1 | 7/2006 | Bae |

FOREIGN PATENT DOCUMENTS

| | | |
|---|---|---|
| CN | 100565095 C | 12/2007 |
| CN | 102067151 A | 5/2011 |
| CN | 102175182 A | 9/2011 |
| CN | 205383994 U | 7/2016 |
| EP | 0595168 A1 | 5/1994 |
| JP | 2000254857 A | 9/2000 |
| TW | M263339 U | 5/2005 |
| TW | I457535 B | 8/2014 |

OTHER PUBLICATIONS

Wang et al., "Application of Eddy Current Sensor to the Structural Modal Testing", The 25th Conference on Theoretical and Applied Mechanics, Dec. 15-16, 2001.
Sanshan et al., "Based on Hall Sensor to Measure the Rotational Speed of the Objects", Feng Chia Univeristy, Jun. 1999.
Sanshan et al., "Based on LVDT to Brake and Throttle Sensing for Tachographs", Feng Chia Unviersity, Jun. 1999.
Wang et al., "Design and Realization of a Three Degrees of Freedom Dispacement Measurement System Composed of Hall Sensors Based on Magnetic Field Fitting by an Elliptic Function" Sensors Journal, Aug. 31, 2015.
Yi Lu, "The Research of Displacement Measurement Utilizing Quartz Tuning Forks", National Chaio Tung University, Jun. 2011.
TW Office Action dated Mar. 12, 2018 as received in Application No. 106139955.

* cited by examiner

CLAMP-TYPE MEASURING DEVICE AND MEASURING METHOD

CROSS-REFERENCE TO RELATED APPLICATIONS

This non-provisional application claims priority under 35 U.S.C. § 119(a) on Patent Application No(s). 106139955 filed in Taiwan, R.O.C. on Nov. 17, 2017, the entire contents of which are hereby incorporated by reference.

TECHNICAL FIELD

The disclosure relates to a clamp-type measuring device and a measuring method, more particularly to a clamp-type measuring device and a measuring method adapted to measure a workpiece.

BACKGROUND

Mechanical components are manufactured through many processes. For example, a metal block would be roughly cut or shaped into a shape similar to the desired shape, and then it would be delivered to another station for detail sharpening. It is understood that the size of the material, such as width, should be confirmed before performing any process in order to precisely control the amount the material needs to be further processed.

SUMMARY OF THE INVENTION

One embodiment of the disclosure provides a clamp-type measuring device, adapted to clamp and measure a workpiece, includes a clamp and an interval measuring module. The clamp includes a guiding rail and two holding arm. Each of the holding arms includes a guide part, a connecting part, and a clamping part. Both ends of the connection part are connected respectively to the guide part and the clamping part where the guide part is movably furnished at the guiding rail, and the two clamping parts are used to clamp the workpiece. The interval measuring module includes a first measuring element and a second measuring element. The first measuring element is furnished at one of the connecting parts. The second measuring element is furnished on the other connecting part. Wherein, the first measuring element and the second measuring element are slidable with respect to the guiding rail through the two guide parts respectively, such that the first measuring element and the second measuring element are movably closing to or away from each other in order to measure an interval between the two clamping parts according to an interval between the first measuring element and the second measuring element.

One embodiment of the disclosure provides a measuring method of a clamp-type measuring device includes clamping a standard workpiece with known width through two holding arms to obtain a first width value of the standard workpiece, obtaining a first interval value between a first measuring element and a second measuring element through a first measuring element and a second measuring element respectively furnished at the two holding arms, obtaining a difference value relationship between the first interval value and the first width value by comparing the first interval value and the first width value, obtaining a second interval value between the first measuring element and the second measuring element through the two holding arms clamping a to-be-measured workpiece with a unknown width, and obtaining a second width value of the to-be-measured workpiece through the second interval value and the difference value relationship.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
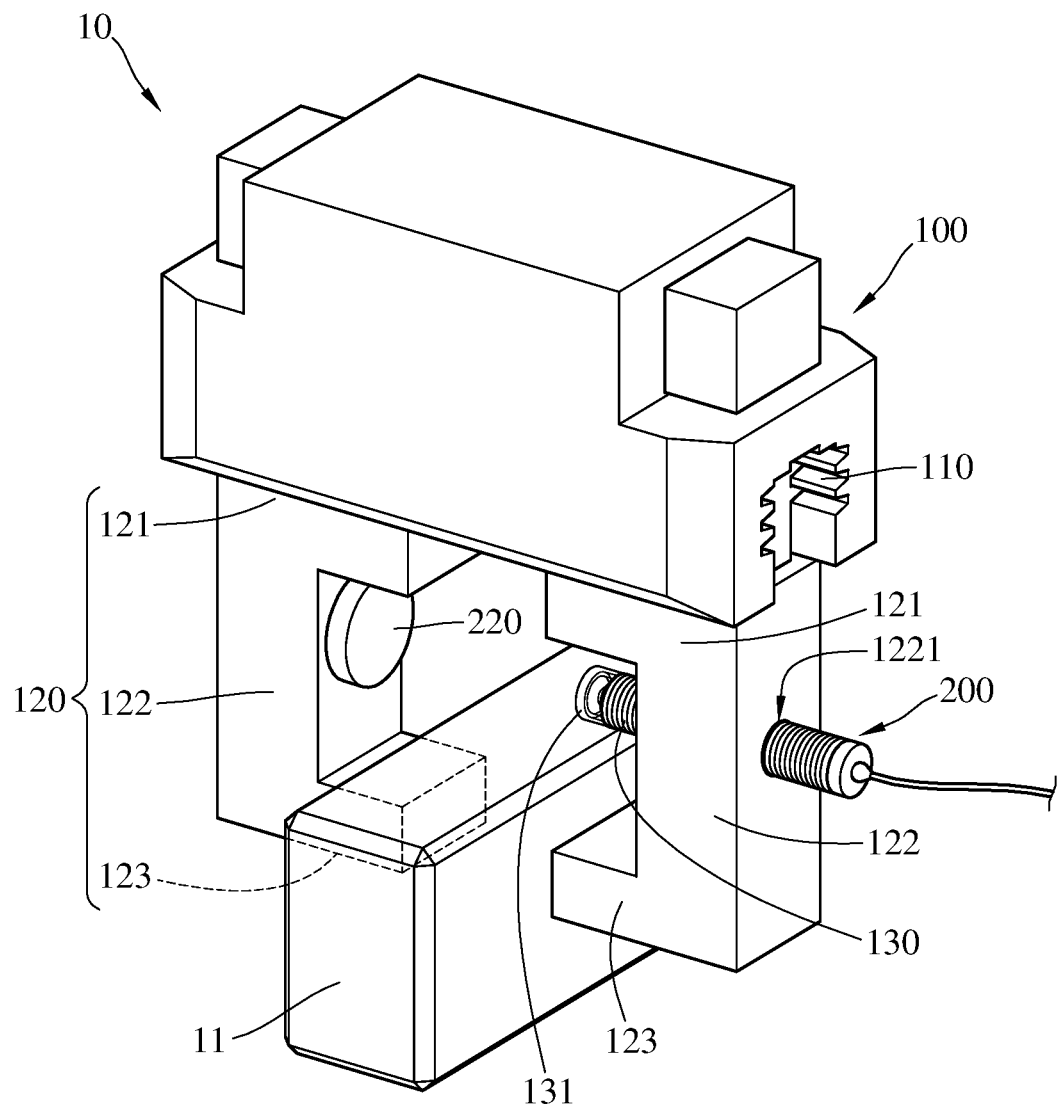
FIG. 1 is a perspective view of a clamp-type measuring device according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
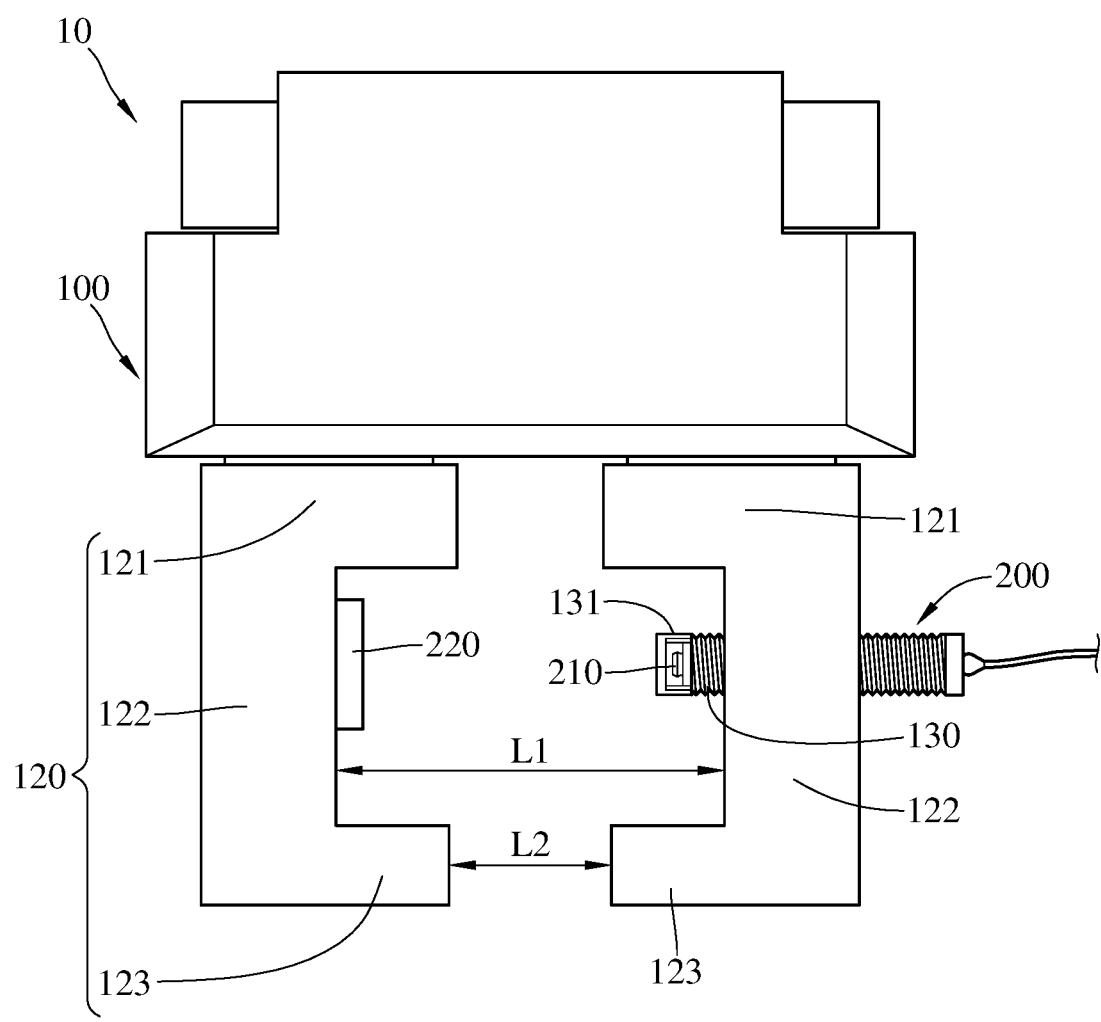
FIG. 2 is a front view of the clamp-type measuring device in FIG. 1.

Please refer to FIG. 1 and FIG. 2. FIG. 1 is a perspective view of a clamp-type measuring device according to a first embodiment of the disclosure. FIG. 2 is a front view of the clamp-type measuring device in FIG. 1.

This embodiment provides a clamp-type measuring device 10 which is adapted to clamping and measuring a workpiece 11. The workpiece 11 is not a final product yet. The clamp-type measuring device 10 includes a clamp 100 and an interval measuring module 200.

The clamp 100 includes a guiding rail 110 and two holding arms 120. Each of the holding arms 120 includes a guide part 121, a connecting part 122, and a clamping part 123. The guide part 121 is movably furnished on the guiding rail 110. Two opposite ends of the connecting part 122 are respectively connected to the guide part 121 and the clamping part 123; that is, both ends of the connecting part 122 are connected respectively to the guide part 121 and the clamping part 123. The two connecting parts 122 are spaced apart by an interval L1 which is longer than an interval L2 between the two clamping parts 123. One of the connecting parts 122 has a threaded hole 1221. The two clamping parts 123 are used to clamp the workpiece 11.

The interval measuring module 200 includes a first measuring element 210 and a second measuring element 220. The first measuring element 210 is furnished at one of the connecting parts 122, and the second measuring element 220 is furnished at the other connecting part 122. In addition, the clamp-type measuring device further includes a sleeve 130 and cap 131. The sleeve 130 is sleeved on the first measuring element 210, and the cap 131 is furnished on the sleeve 130 to cover its end. The sleeve 130 has screw threads on its outer surface so that the sleeve 130 is able to be screwed into threaded hole 1221, enabling the sleeve 130 to move with respect to the connecting part 122 so as to move the first measuring element 210 close to or away from the second measuring element 220. In addition, by the movement of the guide parts 121, the first measuring element 210 and the second measuring element 220 are slidable with respect to the guiding rail 110, which also enables the first measuring element 210 and the second measuring element 220 to move close to or away from each other.

In this embodiment, the cap 131 is permeable to light, but the present disclosure is not limited thereto. In some other embodiments, the clamp-type measuring device 10 may not have the cap 131; in such a case, a portion or whole of the sleeve would be permeable to light.

The first measuring element 210 is, for example, a Hall effect sensor, and the second measuring element 220 is, for example, a magnet for instance. As the interval between the first measuring element 210 and the second measuring element 220 varies, the first measuring element 210 detects corresponding voltage. A regression curve is obtained by recording different voltages and the respective intervals. Therefore, when a voltage is detected by the first measuring element 210, the value of the current interval between the first measuring element 210 and the second measuring element 220 can be obtained from the regression curve.

In this embodiment, the first measuring element 210 (the Hall effect sensor) is movable with respect to the second measuring element 220 (the magnet) through the sleeve 130, but the present disclosure is not limited thereto. In some other embodiments, the second measuring element 220 (the magnet) may be furnished in the sleeve 130 so that the second measuring element 220 becomes movable.

In addition, the types of the first measuring element 210 and the second measuring element 220 are not restricted. In some other embodiments, the first measuring element may be a capacitive sensor or a resistive sensor, and the second measuring element may be a metal block. Furthermore, the interval measuring module 200 is a non-contact measuring device, but the present disclosure is not limited thereto. In some other embodiments, the first measuring element and the second measuring element may together form a contact-type measuring device, and the first measuring element or the second measuring element may be a three-dimensional probe.

Figure 3:
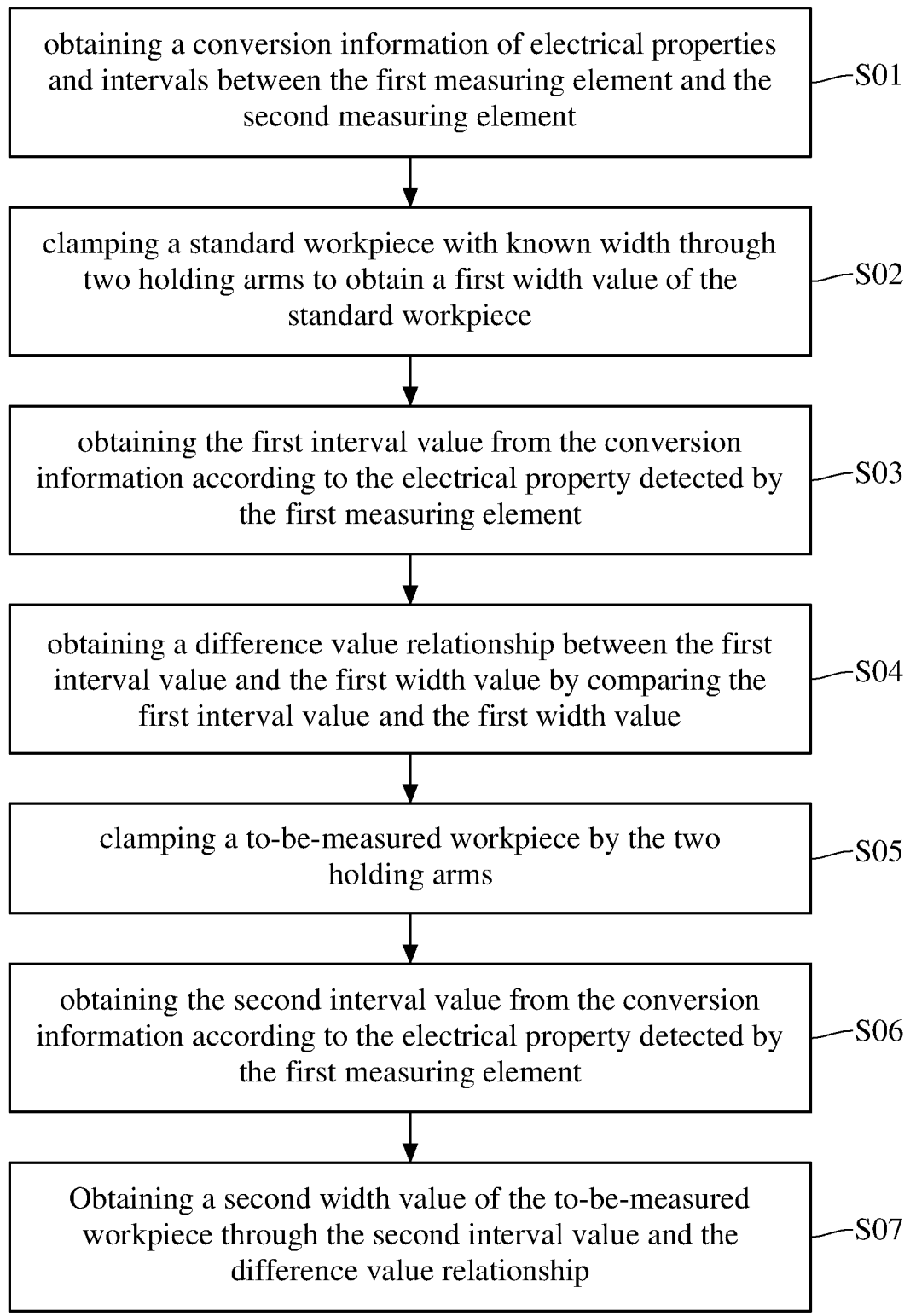
FIG. 3 is a flow chart of a measuring method for the clamp-type measuring device.
Figure 4:
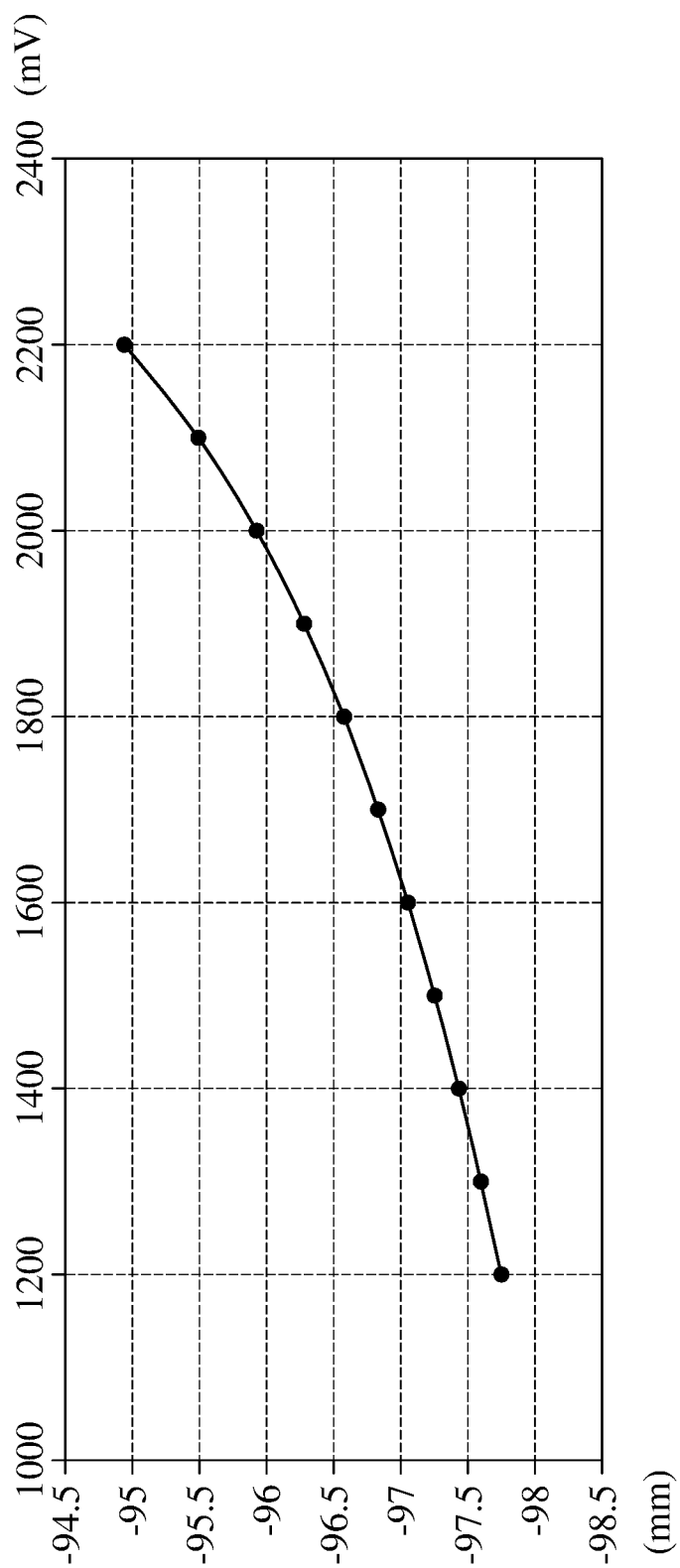
FIG. 4 is a regression curve of voltages and respective intervals.
Figure 5:
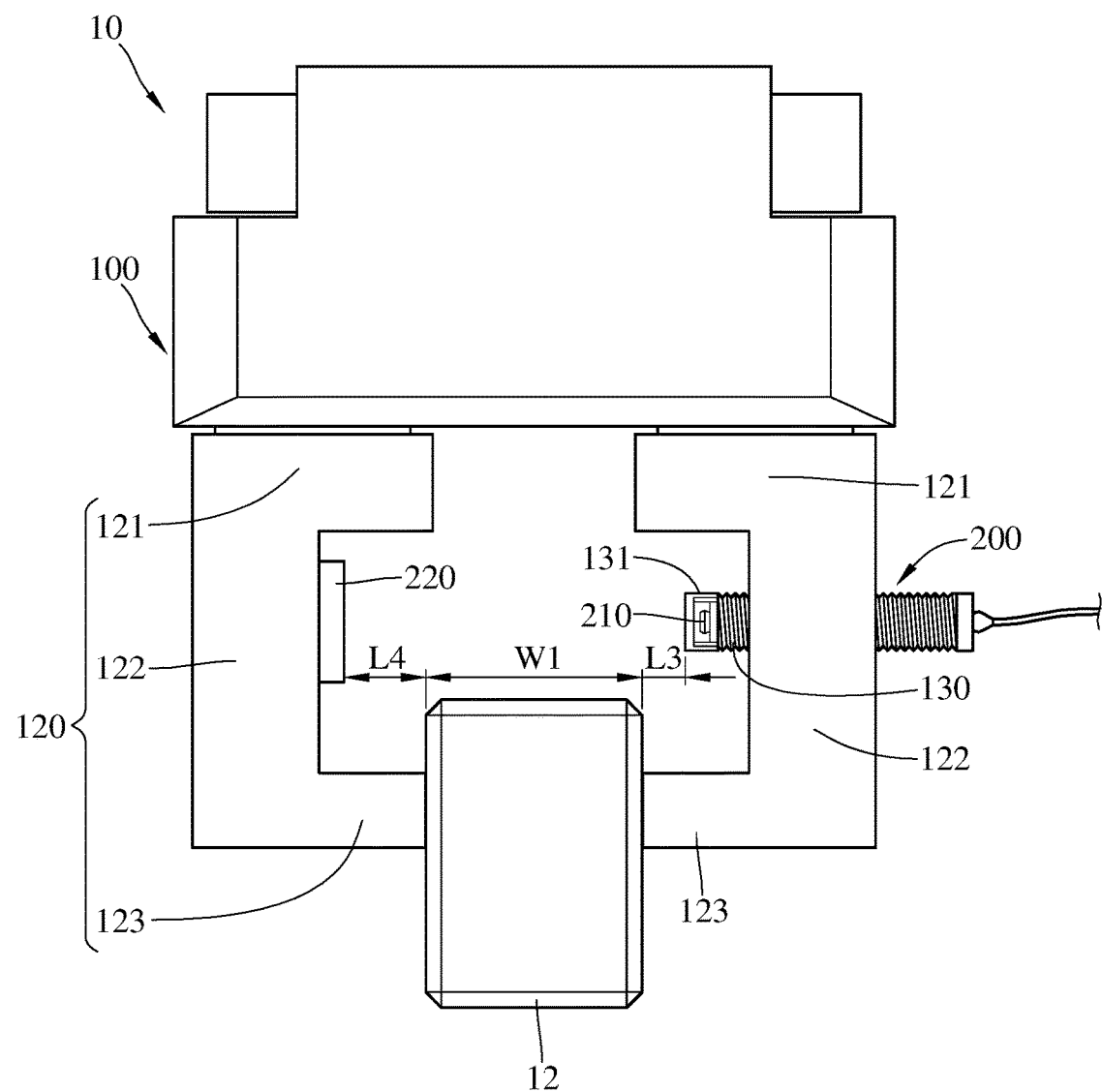
FIG. 5 is a front view of the clamp-type measuring device in FIG. 1 while clamping a standard workpiece.
Figure 6:
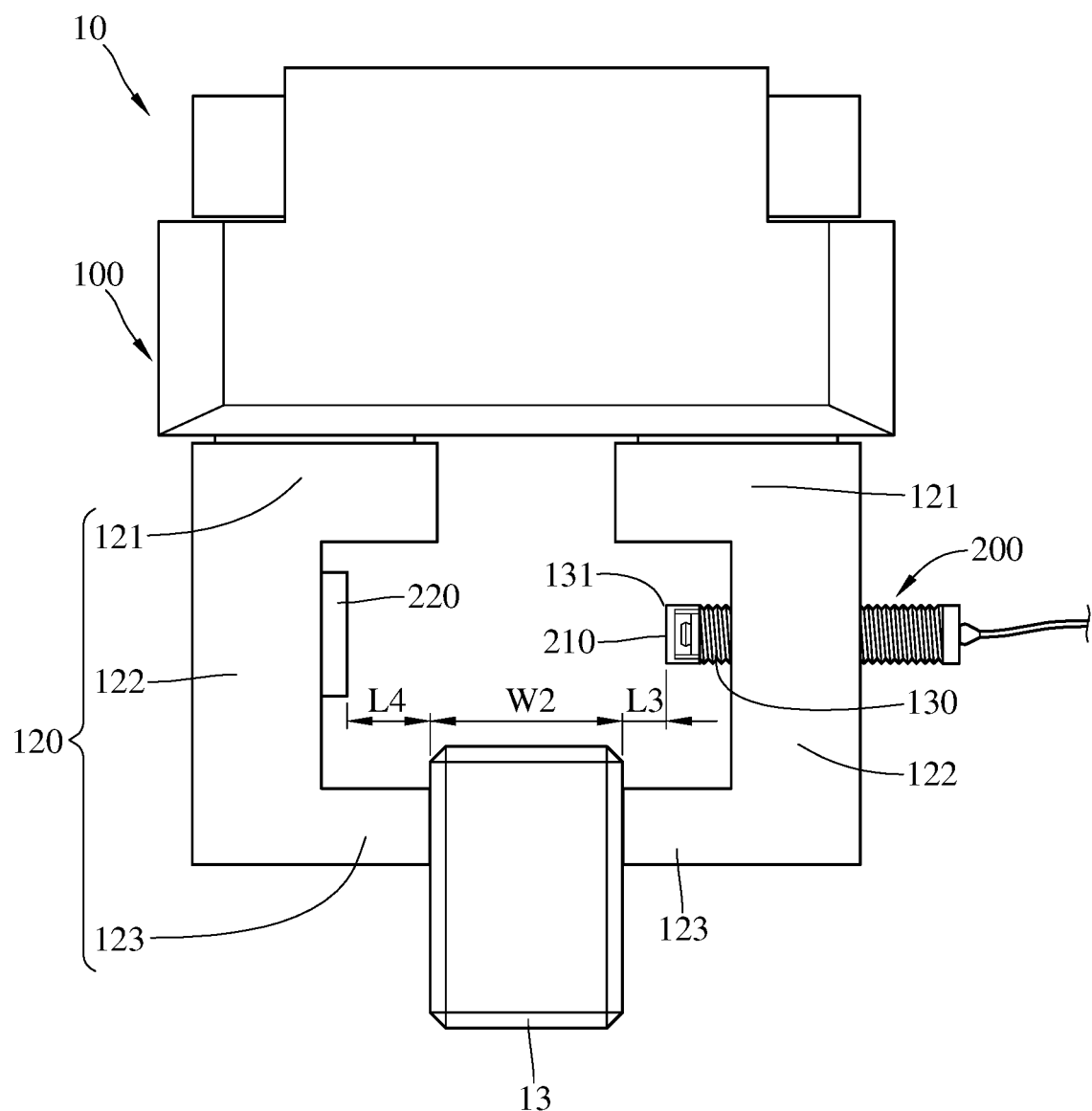
FIG. 6 is a front view of the clamp-type measuring device in FIG. 1 clamping another workpiece to be tested.

The following describes a measuring method for the clamp-type measuring device 10. Please refer to FIG. 3 to FIG. 6. FIG. 3 is a flow chart of a measuring method for the clamp-type measuring device. FIG. 4 is a regression curve of voltages and respective intervals. FIG. 5 is a front view of the clamp-type measuring device in FIG. 1 while clamping a standard workpiece FIG. 6 is a front view of the clamp-type measuring device in FIG. 1 clamping another workpiece to be tested.

As shown in FIG. 3, the measuring method of the clamp-type measuring device 10, includes the following steps. Beginning at step S01, a conversion information is obtained by the electrical properties and the intervals between the first measuring element 210 and the second measuring element 220. The conversion information, in the case of the first embodiment, is the regression curve as discussed in above. At each voltage which detected by the first measuring element 210, for example, 1200 mV, the interval between the first measuring element 210 and the second measuring element 220 is repeatedly measured times over, and the average value of the intervals measured in a fixed voltage is recorded, i.e. 97.736 mm as shown in FIG. 4. It is understood that the interval between the first measuring element 210 and the second measuring element 220 at other voltages can be obtained by the same manner. In other words, the step S01 of the measuring method includes obtaining a conversion information of electrical properties and intervals between the first measuring element 210 and the second measuring element 220. The following table shows every measurement at each voltage.

| | position of magnet (mm) | | | | | |
|---|---|---|---|---|---|---|
| voltage (mV) | 1st measurement | 2nd measurement | 3rd measurement | 4th measurement | 5th measurement | 6th measurement |
| 1200 | −97.736 | −97.735 | −97.735 | −97.736 | −97.736 | −97.738 |
| 1300 | −97.584 | −97.586 | −97.585 | −97.586 | −97.587 | −97.59 |
| 1400 | −97.418 | −97.423 | −97.423 | −97.425 | −97.426 | −97.428 |
| 1500 | −97.241 | −97.243 | −97.244 | −97.245 | −97.245 | −97.248 |
| 1600 | −97.042 | −97.045 | −97.044 | −97.046 | −97.046 | −97.05 |
| 1700 | −96.818 | −96.82 | −96.819 | −96.82 | −96.826 | −96.826 |
| 1800 | −96.563 | −96.563 | −96.566 | −96.565 | −96.571 | −96.571 |
| 1900 | −96.269 | −96.266 | −96.268 | −96.269 | −96.275 | −96.275 |
| 2000 | −95.917 | −95.917 | −95.919 | −95.913 | −95.927 | −95.929 |
| 2100 | −95.49 | −95.488 | −95.492 | −95.484 | −95.503 | −95.498 |
| 2200 | −94.954 | −94.949 | −94.954 | −94.952 | −94.968 | −94.965 |

Then, at step S02, as shown in FIGS. 3 and 5, a standard workpiece 12 with known width is clamped by the holding arms 120, such that a first width value W1 of the standard workpiece 12 is obtained. In other words, the step S02 of the measuring method includes clamping a standard workpiece 12 with known width through two holding arms 120 to obtain a first width value W1 of the standard workpiece 12. Then, at step S03, a first interval value between the first measuring element 210 and the second measuring element 220 is obtained from the conversion information according to the electrical property detected by the first measuring element 210. In other words, the step S03 of the measuring method includes obtaining the first interval value from the conversion information according to the electrical property detected by the first measuring element. Then, at step S04, a difference value relationship, between the first interval value and the first width value W1, is obtained by comparing the first interval value and the first width value W1.

For example, assuming the first width value W1 of the standard workpiece 12 is 80 mm, and a voltage detected by the first measuring element 210 is 1400 mV, the first interval value between the first measuring element 210 and the second measuring element 220, as discussed in the step S03, is 97.423 mm. In this case, the difference value relationship between the first width value W1 and the first interval value is 17.423 mm, and the difference value relationship equals to the sum of a horizontal intervals L3, between one of the two holding arms 120 and the first measuring element 210, and a horizontal intervals L4, between the other holding arm 120 and the second measuring element 220.

Then, at step S05, as shown in FIGS. 3 and 6, a to-be-measured workpiece 13 which has an unknown width W2 is clamped by the holding arms 120. Then, at step S06, a second interval value between the first measuring element 210 and the second measuring element 220 is obtained from the conversion information according to the electrical property detected by the first measuring element 210. Then, at step S07, a second width value W2 of the to-be-measured workpiece 13 is obtained through comparing the second interval value and the aforementioned difference value relationship. Then, determining if second width value W2 falls within a qualified interval. If yes, the workpiece 13 will be determined qualified. If not, the workpiece 13 will be determined unqualified, which means that the workpiece 13 requires to be further machined.

For example, when the holding arms 120 clamp the unknown width of the workpiece 13, the voltage detected by the first measuring element 210 is 1600 mV, and the second interval value obtained through the conversion information is 97.046 mm, the width W2 of the workpiece 13 is obtained by the second interval value minus the aforementioned difference value relationship; that is, the width W2 of the workpiece 13 determined to be 79.623 mm. In other words, the interval, between the first measuring element 210 and the second measuring element 220, minus the sum of the horizontal intervals L3 and the horizontal intervals L4, is the width W2 of the workpiece 13. Then, the width W2 is determined whether falling within the qualified interval. If yes, the workpiece 13 will be determined to be qualified and can be delivered to next process. If not, the workpiece 13 will be delivered back to previous process.

In practice, the voltages detected by the Hall effect sensor in different voltage intervals has different maximum errors in transforming interval and voltage. In detail, when the voltages are in ranges of 1200 mV to 1600 mV, 1600 mV to 1900 mV, and 1600 mV to 2200 mV, the maximum errors in transforming voltage to interval are 2μ, 4μ, and 6μ respectively. That is, when a voltage detected by the first measuring element 210 is in the range of 1200 mV to 1600 mV, the error in transforming the voltage to an interval is lower than errors produced by another voltage in the other ranges of the voltage. Therefore, the linear part of the regression curve in FIG. 4 which is corresponding to the voltage interval 1200 mV to 1600 mV is the best analytic interval for the Hall effect sensor in transforming the voltages to intervals.

Accordingly, when the holding arms 120 clamp the standard workpiece 12, the position of the sleeve 130 can be properly adjusted in order to make the voltage detected by the first measuring element 210 falling within the range between 1200 mV and 1600 mV, thereby improving the measurement accuracy of the interval measuring module 200. In other word, the proper interval between the first measuring element 210 and the second measuring element 220 can be determined by the voltage detected by the first measuring element 210, and it is beneficial to improve the accuracy in measuring the workpiece 13.

Moreover, magnetic force of the second measuring element 220 would affect the ranges of the voltage intervals and the values of the maximum errors in different voltage intervals. In detail, if the second measuring element 220 has strong magnetic force, although the ranges of the voltage intervals would decrease, the maximum errors in different voltage intervals would decrease also. On the contrary, if the second measuring element 220 has weak magnetic force, although the ranges of the voltage intervals would increase, the maximum errors in different voltage intervals would increase also. Therefore, when choosing the magnetic as the second measuring element 220, it must get the balance between the strong magnetic force and the weak magnetic force.

Figure 7:
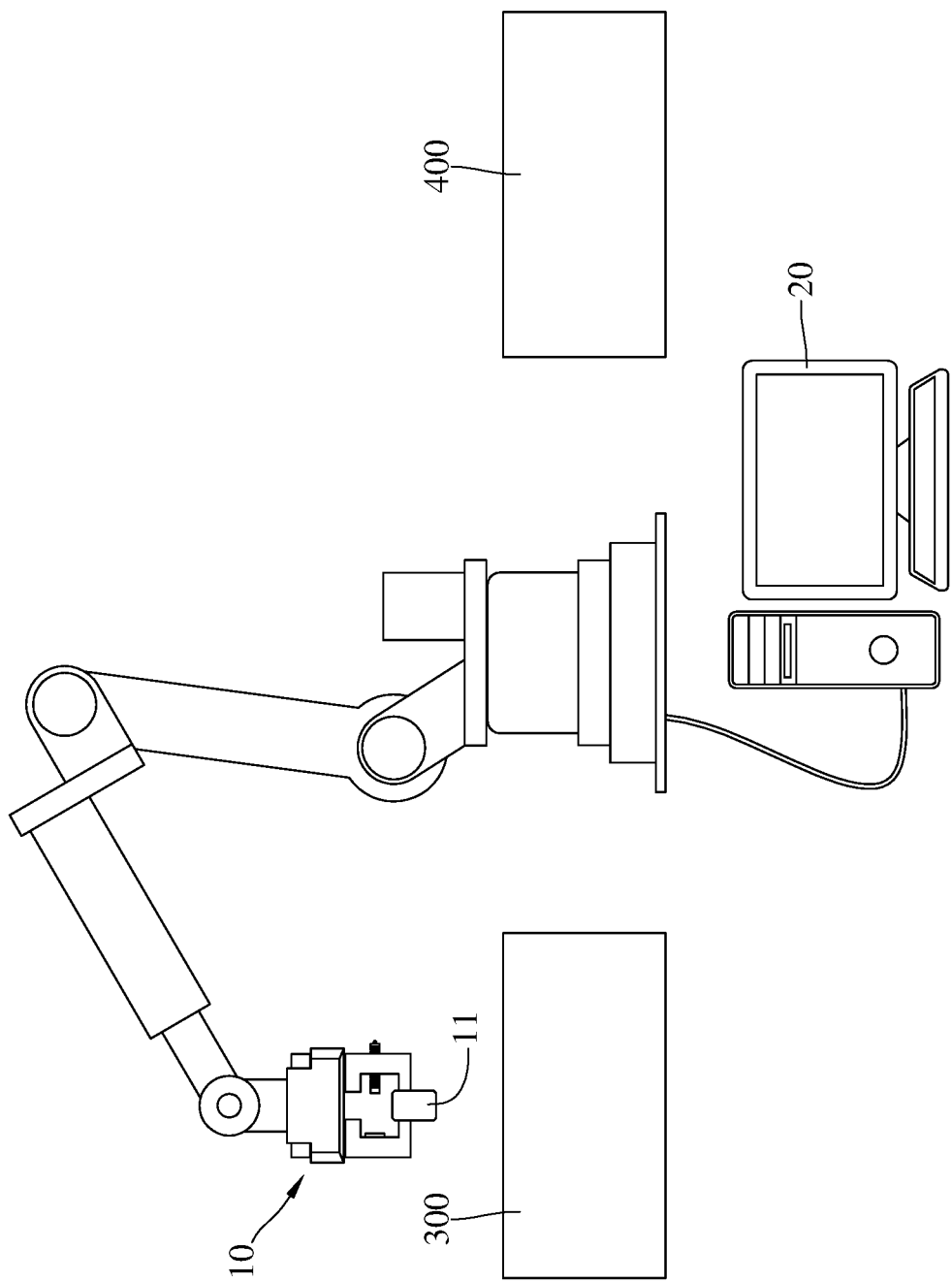
FIG. 7 is a schematic view showing the clamp-type measuring device in FIG. 1 being applied in a production line.

Please refer to FIG. 7. FIG. 7 is a schematic view showing the clamp-type measuring device in FIG. 1 being applied in a production line.

By the aforementioned measuring method, a width of a workpiece 11 can be obtained when it is clamped by the clamp-type measuring device 10 so as to determine whether the width of the workpiece 11 falls within an acceptable range (or a proper range). If the width of the workpiece 11 is out of the acceptable range, then a back-end processing unit 20 will determine the amount the workpiece 11 fails to be machined at the previous station (e.g. a station 300), and the clamp-type measuring device 10 will bring the workpiece 11 bake to the station 300. On the contrary, if the width of the workpiece 11 falls within the acceptable range, the back-end processing unit 20 will determine the amount the workpiece 11 still requires to be machined in the next station (e.g. a station 400), and the clamp-type measuring device 10 will bring the workpiece 11 to the station 400.

Accordingly, the clamp-type measuring device 10 can measure the width of the workpiece 11 and determine where the workpiece 11 should be delivered while clamping it, which is beneficial to improve the efficiency in measurement.

In this embodiment, the first measuring element 210 is furnished on the connecting part 122 through the sleeve 130, but the present disclosure is not limited thereto. In some other embodiments, the first measuring element may be directly fixed on the connecting part.

According to the clamp-type measuring device and the measuring method as discussed above, the first measuring element and the second measuring element are respectively furnished on the holding arms, and the width of the workpiece can be obtained according to the regression curve of the electrical property and interval between the first measuring element and the second measuring element, such that the clamp-type measuring device can measure the width of the workpiece while clamping it. Therefore, comparing an operation that clamping and measuring are separately performed, the clamp-type measuring device and the measuring method are beneficial to improve the overall efficiency.

In addition, the back-end processing unit for determining whether the width of the workpiece falls within the acceptable range is beneficial to increase reliability.

Moreover, the sleeve enables the interval between the first measuring element and the second measuring element to be finely adjusted to a proper value so as to improve the measuring accuracy of the clamp-type measuring device.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A clamp-type measuring device, adapted to clamp and measure a workpiece, comprising:
   a clamp, further comprising:
      a guiding rail; and
      two holding arms, each of them further comprising a guide part, a connecting part and a clamping part; both ends of the connecting part are connected respectively to the guide part and the clamping part where the guide part is movably furnished at the guiding rail; and the two clamping parts are used to clamp the workpiece; and
   an interval measuring module, further comprising:
      a first measuring element furnished at one of the connecting parts; and
      a second measuring element furnished at the other connecting part;
   wherein, the first measuring element and the second measuring element are slidable with respect to the guiding rail through the two guide parts respectively, such that the first measuring element and the second measuring element are movably closing to or away from each other in order to measure an interval between the two clamping parts according to an interval between the first measuring element and the second measuring element.

2. The clamp-type measuring device according to the claim 1, further comprising a sleeve, wherein one of the two connecting parts has a threaded hole, the sleeve is sleeved on the first measuring element, and the sleeve is screwed into the threaded hole, such that the first measuring element is movable with respect to the second measuring element by moving the sleeve.

3. The clamp-type measuring device according to the claim 1, further comprising a cap furnished on the sleeve, wherein the cap is permeable to light.

4. The clamp-type measuring device according to the claim 1, wherein the first measuring element is a Hall effect sensor, and the second measuring element is a magnet.

5. The clamp-type measuring device according to the claim 1, wherein the first measuring element is a capacitive sensor, and the second measuring element is a metal block.

6. The clamp-type measuring device according to the claim 1, wherein the first measuring element is a resistive sensor, and the second measuring element is a metal block.

7. The clamp-type measuring device according to the claim 1, wherein the first measuring element and the second measuring element together form a contact-type measuring device.

8. The clamp-type measuring device according to the claim 7, wherein the first measuring element or the second measuring element is a three-dimensional probe.

9. The clamp-type measuring device according to the claim 1, wherein as the interval between the first measuring element and the second measuring element varies, the first measuring element detects corresponding voltage, and a regression curve is obtained according to voltages and respective intervals.

10. The clamp-type measuring device according to the claim 9, wherein as the corresponding voltage is detected by the first measuring element, the interval between the first measuring element and the second measuring element is obtained from the regression curve.

11. The clamp-type measuring device according to the claim 9, wherein a linear part of the regression curve is the best analytic interval of the Hall effect sensor in transforming the voltages to intervals.

12. A measuring method of a clamp-type measuring device, comprising:
clamping a standard workpiece with known width through two holding arms to obtain a first width value of the standard workpiece;
obtaining a first interval value between a first measuring element and a second measuring element through a first measuring element and a second measuring element respectively furnished at the two holding arms;
obtaining a difference value relationship between the first interval value and the first width value by comparing the first interval value and the first width value;
obtaining a second interval value between the first measuring element and the second measuring element through the two holding arms clamping a to-be-measured workpiece with an unknown width; and
obtaining a second width value of the to-be-measured workpiece through the second interval value and the difference value relationship.

13. The measuring method of the clamp-type measuring device according to the claim 12, before clamping the standard workpiece with known width through two holding arms to obtain the first width value of the standard workpiece, further comprising:
obtaining a conversion information of electrical properties and intervals between the first measuring element and the second measuring element.

14. The measuring method of the clamp-type measuring device according to the claim 13, wherein the step of obtaining the first interval value between the first measuring element and the second measuring element through the first measuring element and the second measuring element respectively furnished at the two holding arms, further comprises:
obtaining the first interval value from the conversion information according to the electrical property detected by the first measuring element.

15. The measuring method of the clamp-type measuring device according to the claim 13, wherein the step of obtaining the second interval value between the first measuring element and the second measuring element through the two holding arms clamping the to-be-measured workpiece with the unknown width further comprises:
obtaining the second interval value from the conversion information according to the electrical property detected by the first measuring element.

16. The measuring method of the clamp-type measuring device according to the claim 12, wherein after obtaining the second width value further comprising:
determining if the second width value falls within a qualified interval;
if yes, the another workpiece will be determined qualified;
if not, the another workpiece will be determined unqualified.

17. The measuring method of the clamp-type measuring device according to the claim 12, wherein the first measuring element is a Hall effect sensor, and the second measuring element is a magnet.

18. The measuring method of the clamp-type measuring device according to the claim 12, wherein the first measuring element is a capacitive sensor, and the second measuring element is a metal block.

19. The measuring method of the clamp-type measuring device according to the claim 12, wherein the first measuring element is a resistive sensor, and the second measuring element is a metal block.

20. The measuring method of the clamp-type measuring device according to the claim 12, wherein the first measuring element and the second measuring element together form a contact-type measuring device.

21. The measuring method of the clamp-type measuring device according to the claim 20, wherein the first measuring element or the second measuring element is a three-dimensional probe.

22. The measuring method of the clamp-type measuring device according to the claim 13, wherein a linear part of the of the conversion information is the best analytic interval of the Hall effect sensor in transforming voltages to intervals.

* * * * *